US006951960B2

United States Patent
Perraud

(10) Patent No.: US 6,951,960 B2
(45) Date of Patent: Oct. 4, 2005

(54) METHOD FOR REMOVING IMPURITIES FROM SOLVENT EXTRACTION SOLUTIONS

(75) Inventor: Jean-Jacques Robert Perraud, New Caledonia (FR)

(73) Assignee: Inco Limited, Toronto (CA)

( * ) Notice: Subject to any disclaimer, the term of this patent is extended or adjusted under 35 U.S.C. 154(b) by 326 days.

(21) Appl. No.: 10/195,969

(22) Filed: Jul. 16, 2002

(65) Prior Publication Data

US 2004/0014589 A1 Jan. 22, 2004

(51) Int. Cl.[7] .......................... C07C 209/82; C07F 3/08; C07F 15/02; C22B 1/244
(52) U.S. Cl. .......................... 564/497; 75/722; 556/118; 556/138
(58) Field of Search .......................... 75/722; 556/118, 556/138; 564/497

(56) References Cited

U.S. PATENT DOCUMENTS

| | | | |
|---|---|---|---|
| 3,082,062 A | 3/1963 | Preuss, Jr. .......................... 23/92 |
| 3,193,381 A | 7/1965 | George et al. .......................... 75/108 |
| 4,004,990 A | 1/1977 | Suetsuna et al. .......................... 204/113 |
| 4,016,054 A | 4/1977 | Gandon et al. .......................... 204/105 |
| 4,193,968 A | 3/1980 | Sullivan et al. .......................... 423/112 |
| 4,203,964 A | * 5/1980 | Reinhardt et al. .......................... 423/658.5 |
| 4,765,834 A | 8/1988 | Ananthapadmanabhan et al. .......................... 75/108 |
| 5,045,244 A | * 9/1991 | Marlett .......................... 260/665 G |
| 5,447,552 A | 9/1995 | Mihaylov et al. .......................... 75/722 |
| 5,759,512 A | 6/1998 | Rickelton et al. .......................... 423/658.5 |
| 6,022,991 A | 2/2000 | Perraud et al. .......................... 562/9 |

FOREIGN PATENT DOCUMENTS

| | | |
|---|---|---|
| JP | 622-218525 | 9/1987 |
| WO | WO 0196621 A1 | 12/2001 |

OTHER PUBLICATIONS

McDonald, C., et al., "Removal of Zinc Ions from Aqueous Chloride Soultions by Solvent Extraction Using Alamine 308", Separation Science and Technology, 14(9), pp. 741–747, 1979.

* cited by examiner

Primary Examiner—Stanley S. Silverman
Assistant Examiner—Jonas N. Strickland
(74) Attorney, Agent, or Firm—Edward A. Steen

(57) ABSTRACT

A method for regenerating an amine extractant used for recovery of metals involves contacting a liquid organic phase containing an amine complexed with one or more metals with an aqueous solution substantially free of chloride ions to strip the one or more metals from the organic phase. The stripped organic phase is then contacted with a solution of hydrochloric acid to regenerate the amine extractant which can then be recycled in a production process.

16 Claims, 1 Drawing Sheet

METHOD FOR REMOVING IMPURITIES FROM SOLVENT EXTRACTION SOLUTIONS

FIELD OF INVENTION

This invention relates to the field of regenerating amine solvent extractants used in extraction of metals from aqueous solutions.

BACKGROUND OF THE INVENTION

Techniques for extraction of metals from aqueous solutions obtained from ore or other sources are well-known. For example, an aqueous solution containing one or more metals of interest which originates from acid leaching of oxide ores, sulfide ores or lateritic ores may be contacted with an organic phase containing an extractant to concentrate the metal(s). More particularly, the extractant reacts with the metal to form a complex ("loading") which is soluble in the organic phase. The extractant is chosen so that undesirable compounds, such as particular metals and other impurities, will not complex with it and remain in the aqueous phase (the "raffinate") which is discarded or otherwise processed. The loaded organic phase may then be scrubbed to selectively remove further impurities. The metal(s) of interest is then obtained from the organic phase by stripping. Stripping typically involves reversing the reaction which caused the extractant to complex with the metal to produce an aqueous solution with even lower volume and more highly concentrated metal. The organic phase may then be subjected to a regeneration step which removes residual metals or impurities so that the organic phase can be recycled in the extraction process. Examples of processes for extraction are provided by U.S. Pat. Nos. 3,193,381, 5,447,552, 5,759,512 and 6,022,991, each incorporated herein by reference in their entireties.

A process for removal of ferric chloride from iron-aluminum chloride solutions and from iron-aluminum chloride solutions containing free hydrochloric acid using amines as liquid ion exchangers is described in U.S. Pat. No. 3,082,062. In one aspect, a cyclical process is described wherein a feed liquor which could optionally be $FeCl_3$, $AlCl_3$ and HCl, or just $FeCl_3$ and $AlCl_3$ is fed into an extractor. The $FeCl_3$ is removed from the aqueous phase and transferred to an organic phase containing an amine hydrochloride. The $FeCl_3$ is stripped from the organic phase and removed as an aqueous liquor which is substantially free of excess HCl. The amine hydrochloride, which is substantially free of iron, is then directed into the initial extractor.

A process for recovering gallium is described in U.S. Pat. No. 4,193,968. As described therein, an acid leach solution containing aluminum, ferric and gallium chlorides is treated by an amine ion exchanger which extracts the ferric and gallium values from the aluminum chloride solution. The amine may be a primary, secondary or tertiary amine which is dissolved in a water immiscible organic solvent that may also contain an alcohol. The organic phase containing the iron and gallium is separated from the aqueous phase which contains the aluminum chloride. The organic phase is then contacted with water or weak acid to strip it of iron and gallium. The resulting aqueous strip solution contains ferric and gallium chloride. The ferric ions are then converted to ferrous and gallium ions to gallium tetrachloride. The solution is then subjected to a second amine exchange which extracts only the gallium. The organic phase is stripped with either water or weak hydrochloric acid and then recycled to the extraction unit.

Extraction of nickel from acid leach solutions is described, for example, in U.S. Pat. No. 5,447,552. In accordance with that disclosure, a solvent extraction process may include a primary extraction step which involves contacting an aqueous leach solution containing Ni, Co, Zn, Mg, Mn, Ca, Fe and sulfate ions with an organic phase containing a dithiophosphinic extractant which selectively extracts Ni, Co, Fe and Zn. The aqueous solution containing Mg, Mn and Ca with sulfate anions (raffinate) may be separated from the organic phase and discarded. The Ni/Co/Zn/Fe loaded organic phase may then be contacted with an aqueous phase made acidic with a mineral acid to strip the Ni/Co/Zn/Fe from the organic phase into the acidic aqueous phase which is considered to be the product of the primary extraction phase. Zn may be removed from the aqueous primary extraction product by, e.g., ion exchange, which produces a product containing Ni/Co/Fe. Ni and Co may then be selectively removed from this product by means of a secondary extraction step using an amine solvent extractant, e.g., a tertiary amine in a water immiscible organic liquid. Ideally, Co is loaded onto the amine extractant and Ni is left in the acidic aqueous phase. The Co loaded amine may be contacted with a weak acidic aqueous solution to strip the Co from the organic phase and regenerate the amine solvent extractant for recycling into the secondary extraction step. U.S. Pat. No. 4,016,054 discloses that Co can be extracted from ferro-nickel using the tertiary amine triisooctylamine in an organic phase which is regenerated using a decinormal hydrochloric solution.

A problem with the secondary extraction step occurs due to the presence of Fe and trace amounts of Zn which pass through from the earlier extraction steps. Unfortunately, the Zn and Fe load strongly onto the amine extractant and are not removed from the organic phase as easily as Co. Accordingly, after repeated recycling of the amine extractant, there is a build-up of Zn and Fe in the organic phase. Such build-up interferes with loading of Co on the extractant and may eventually saturate the extractant, resulting in a loss of loading efficiency and eventually complete cessation of Co loading. One approach to dealing with this problem is to separately treat the amine extractant phase with a strong base solution to strip Zn and precipitate Fe as a hydroxide. See, e.g., U.S. Pat. No. 4,004,990. Unfortunately, this process results in precipitation of the Zn and Fe hydroxides as extremely fine particles which settle extremely slowly or not at all. As a result, a time consuming and relatively complicated filtration process is necessary to remove the fine solids.

SUMMARY OF THE INVENTION

A process for regenerating metal loading capacity of an amine includes providing a liquid organic phase containing an amine complexed with a metal that loads on the amine as a chloride complex; contacting said liquid organic phase with an aqueous solution substantially free of chloride ions to strip said metal; and contacting the stripped organic phase with a solution containing chloride ions to hydrochlorinate the amine. The metal is preferably Zn and/or Fe. The liquid organic phase may advantageously contain an aliphatic diluent or an aromatic diluent and, optionally, an alcohol. The aqueous solution may advantageously include sulfate ions, nitrate ions and/or phosphate ions. The solution containing chloride ions is advantageously an HCl solution.

A method for removing Zn from an amine chloride complex includes providing a liquid organic phase containing an amine chloride complexed with Zn and contacting said liquid organic phase with an aqueous solution substantially free of chloride ions to strip the Zn. The liquid organic phase may advantageously contain an aliphatic diluent or an aromatic diluent and, optionally, an alcohol. The aqueous solution may advantageously include sulfate ions, nitrate ions and/or phosphate ions. The amine complex may also include Fe. The method may be incorporated in a process for extracting Ni or Co from an aqueous solution.

DESCRIPTION OF PREFERRED EMBODIMENT

Figure 1:
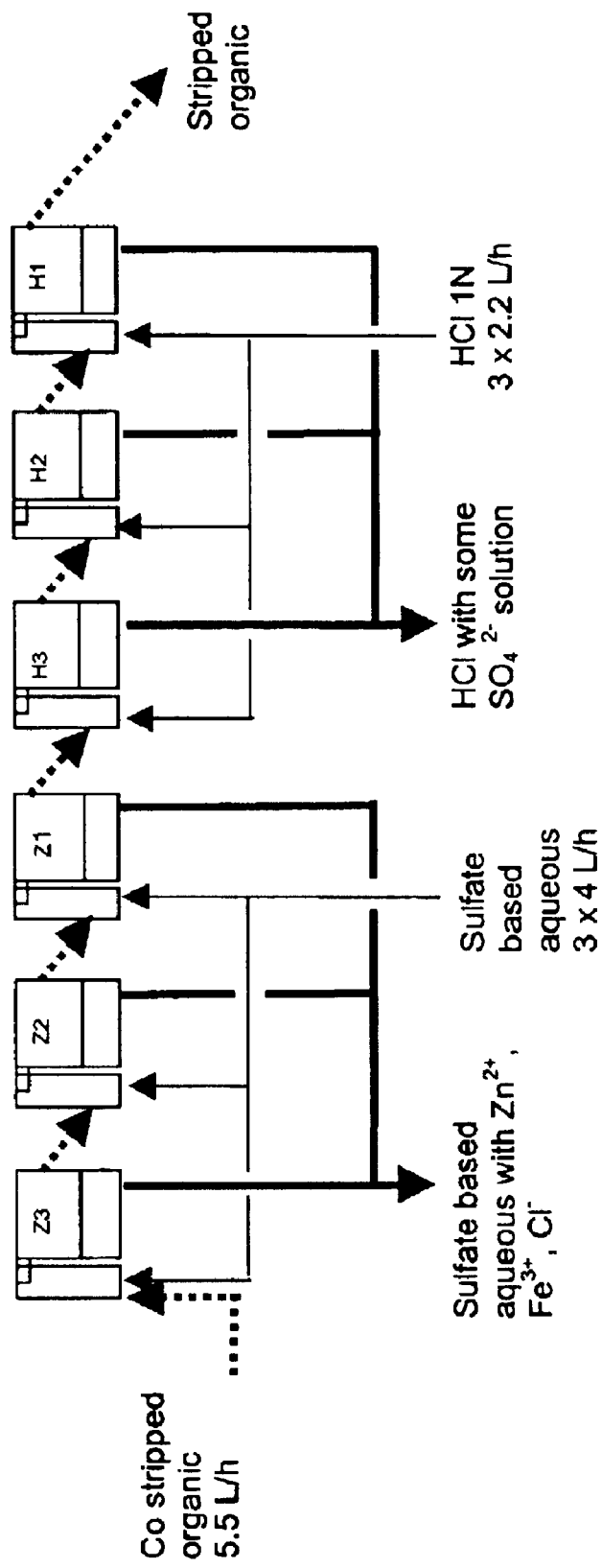
FIG. 1 is a schematic representation of a process according to the present invention involving a continuous circuit in which Zn and Fe are stripped from an organic phase containing an amine which is then contacted with HC 1 to hydrochlorinate the amine.

The present invention provides an extraction solvent regeneration process adapted for use in hydrometallurgical processes. The process removes impurities from a liquid organic phase containing an amine organic compound loaded with a metal anionic chloride complex without solid precipitate formation. The present invention is especially suited for Ni and Co extraction and/or separation procedures using an amine solvent extractant wherein undesired elements such as Fe and Zn build up in the organic phase. The present invention provides an efficient technique for stripping Fe and Zn from the organic phase and regenerating the loading capacity of the amine without caustic reagents and complicated filtration steps.

Since regeneration is accomplished without solids formation, the process may be carried out in either a batch or continuous mode of operation. In general, the process according to the present invention strips unwanted metals that have loaded on an amine. The amine may be any suitable primary, secondary or tertiary amine utilized in extraction of metals by those skilled in the art. An example of such an amine has the formula $R^1 R^2 R^3 N$ wherein $R^1$, $R^2$ and $R^3$ may be the same or different and are aliphatic, aryl, aromatic chains or hydrogen atom(s), e.g., $R^1 R^2 NH$ where $R^1$ and $R^2$ are not hydrogen, or $R^1 NH_2$ where $R^1$ is not hydrogen. Exemplary tertiary amines include triisooctylamine (Alamine™308 available from Henkel MID Extraction Technology, Tucson, Az), triphenylamine, triisobutylamine, triisobutylamine, trihexylamine, and triisononylamine. Other suitable commercially available products are Alamine™336 (Henkel MID Extraction Technology), Hostarex™A324 (Clariant Mining Chemicals, Sulzbach, Germany), Hostarex™A327, Adogen™ 283 and Amberlite™ LA-2 (Rohm and Haas).

The amine is dissolved in an organic phase including an organic solvent. Suitable organic solvents are well-known. Examples include kerosene, benzene, toluene and the like. In a preferred embodiment, the organic solvent is an aliphatic diluent solvent such as a paraffin solvent. For example, Isopar M (commercially available from Exxon Mobil Corp., Fairfax, Va.) is made of isoparaffins. In another preferred embodiment, the organic phase includes a mixture of aromatic hydrocarbons such as Shellsol™ A150 (commercially available from Shell Chemicals, Houston, Tex.). The organic phase may also include a cosolvent such as one or more alcohols. Preferred alcohols are alkanols such as isodecanol (commercially available as Exxal 10 from Exxon Mobil Corp., Fairfax, Va.). The amount of amine such as triisooctylamine preferably ranges from about 1 vol. % to about 50 vol. % in the organic phase, and more preferably from about 5 vol. % to about 35 vol. %. A preferred embodiment incorporates about 20 vol. %. When a cosolvent is utilized, the organic phase includes about 50 vol. % to about 99 vol. % of the organic solvent, e.g. about 65 vol. % Isopar M or about 75 vol. % Shellsol A150, and the cosolvent may preferably be present in an amount ranging from about 0 vol. % to about 25 vol. %. For example, isodecanol may be present from about 5 vol. % to about 15 vol. %.

The amine containing organic phase is typically loaded with Zn and/or Fe by one or repeated contacts with a leach solution or the product of an extraction step in purification of metals. Regardless of how the Zn or Fe is loaded onto the amine, an aqueous solution substantially free of chloride ions is used to strip Zn and/or Fe from the organic phase. As used herein, "substantially" free of chloride ions is intended to indicate that the solution may be totally devoid of chloride ions or almost totally devoid of chloride ions as long as the amount of chloride ions present does not appreciably interfere with the ability of the Zn and/or Fe to be stripped from the amine. The aqueous solution preferably has sufficient ionic strength for proper phase separation. Accordingly, an aqueous solution would preferably contain ions which still provide a substantially chloride ion free solution but impart a high enough ionic strength. Sulfate, nitrate and phosphate ions are suitable. Acids, e.g., sulfuric acid, and metal salts of such ions having metals which will not complex with the amine, such as Ca, Mg, Na, or Ni are preferred. Suitable concentrations of ions range from about 0.01 to about 300 grams per liter.

Thus, the Zn/Fe loaded organic phase is contacted with the aqueous solution which is substantially free of chloride ions at a temperature preferably ranging from about 10° C. to about 80° C., e.g., 50° C., and at a suitable pressure, e.g., normal atmosphere. The ratio of the liquid organic phase to the aqueous phase (O/A) can preferably range from about 5 to 1 to about 1 to 5. For example, the O/A ratio can be about 1. The time necessary to keep the phases in contact is relatively short, e.g., preferably about 1 minute to about 60 minutes, e.g. 2–3 minutes. Those skilled in the art are familiar with numerous techniques to insure that the two phases come into suitable contact to effect stripping, e.g., agitation, magnetic stirring, countercurrent, cross-current, etc. The resulting aqueous solution contains Zn and/or Fe which is separated from the organic phase.

In order to completely regenerate the organic phase, it is contacted with an HCl solution to restore the amine extractant to a hydrochlorinated form ($R^1 R^2 R^3$ NHCl) to remove the sulfate, nitrate and/or phosphate ions initially present in the aqueous solution. The HCl solution preferably ranges from 0.5–6N or higher. The temperature can preferably range from about 10° C. to about 80° C. at any suitable pressure, e.g., 1 atmosphere. The reaction time preferably can range from about 1 to about 60 minutes, e.g. 2–3 minutes. After regenerating, the amine extractant can be returned to a solvent extraction circuit. As stated above, the entire procedure can be run batchwise or continuously using any solvent cross-current circuit.

It should be understood that those skilled in the art may modify the concentrations of the materials, the temperature, pressure and time set forth above by routine experimentation to vary the efficiency of the process disclosed herein. Although, the following Examples illustrate certain preferred features and embodiments, they are not intended to limit the present invention in any aspect.

EXAMPLE 1

An organic solution initially made of 20 vol % Alamine 308, 65 vol % aliphatic diluent (Isopar-M from Imperial Oil)

and 15 vol % isodecanol (Exxal 10) was loaded during a pilot operation with 1.63 g/L Fe and 0.27 g/L Zn. The reactor vessel was a 500 mL glass beaker agitated with a magnetic stirrer at ambient temperature. 100 mL of the Co stripped Zn/Fe loaded organic extractant solution and 100 mL of sulfate based solution (3.27 g/L S) were introduced in the reactor and kept in mixed contact for a few minutes, then agitation was stopped; organic and aqueous phases were allowed to settle. Organic and aqueous samples were taken from the reactor after phase separation. The assays showed that the Fe concentration dramatically went down while Zn concentration decreased marginally. The aqueous phase was discarded. The test was repeated replacing 100 mL of fresh sulfate based solution in the beaker, recycling the same organic for a second contact. Eventually a third contact with fresh aqueous was performed on organic saved after the second contact.

| Organic contents | Zn (gL) | Fe (gL) | | |
|---|---|---|---|---|
| Initial | 0.270 | 1.63 | | |
| Contact#1 | 0.261 | 0.077 | | |
| Contact#2 | 0.168 | 0.001 | | |
| Contact#3 | 0.063 | 0.000 | | |
| Total Zn removed | 0.207 (76%) | | | |
| Total Fe removed | | 1.63 (100%) | | |
| Aqueous contents | Zn (gL) | Fe (g/L) | S (g/L) | Removed S (g/L) |
| Fresh aqueous | 0.000 | 0.014 | 3.27 | 0 |
| Contact#1 | 0.024 | 1.53 | 2.56 | 0.71 |
| Contact#2 | 0.080 | 0.142 | 2.14 | 1.13 |
| Contact#3 | 0.086 | 0.012 | 2.29 | 1.28 |
| Total Zn transferred | 0.190 | | | |
| Total Fe received | | 1.64 | | |
| Total S removed | | | | 2.82 |

Based on aqueous assays, it is assumed that the organic loaded 2.82 g/L of S (as sulfate). The Zn/Fe stripped organic was introduced again in the beaker where 100 mL of 0.5 N HCl was added. A first contact between the organic and 0.5 N HCl aqueous phase was performed following similar procedure to above. After settling, both phases were sampled and aqueous phase was replaced by 100 mL of fresh 0.5 N HCl for a second contact. Assay results follow:

| Organic contents | Zn (g/L) | Fe (g/L) | |
|---|---|---|---|
| Initial | 0.063 | 1.63 | |
| Contact#1 | 0.026 | 0.077 | |
| Contact#2 | 0.027 | 0.001 | |
| Total Zn removed | 0.243 (90%) | | |
| Aqueous contents | Zn (g/L) | Fe (g/L) | S (g/L) |
| HCl 0.5 N | 0.000 | 0.000 | 0.000 |
| Contact#1 | 0.010 | 0.000 | 2.55 |
| Contact#2 | 0.001 | 0.000 | 0.326 |
| Total Zn transferred | 0.011 | | |
| Total Fe received | | 1.64 | |
| Total S removed | | | 2.88 |

The S assays show that the S loaded in the organic was entirely released in the HCl aqueous phase in two contacts.

EXAMPLE 2

An organic solution initially made of 20 vol % Alamine 308, 65 vol % aliphatic diluent (Isopar-M from Imperial Oil) and 15 vol % isodecanol (Exxal 10) was loaded during a pilot operation with 1.11 g/L Fe and 1.96 g/L Zn. The reactor vessel was a 250 L capacity conical bottom agitated tank which was operated at ambient temperature. 100 L of the Co stripped Zn/Fe loaded organic extractant solution and 80 L of sulfate based solution (2.84 g/L S) were introduced in the reactor and kept in mixed contact for a few minutes, then agitation was stopped. Organic and aqueous phases were allowed to settle. Organic and aqueous samples were taken after phase separation. The assays showed that the Fe concentration dramatically went down while Zn concentration decreased marginally. The aqueous phase was discarded. The aqueous sulfate-based solution contact was repeated three times replacing 80 L of fresh sulfate based solution in the reactor each time and keeping the same organic for successive contacts.

| Organic contents | Zn (gL) | Fe (g/L) | | |
|---|---|---|---|---|
| Initial | 1.96 | 1.11 | | |
| Contact#1 | 1.38 | 0.074 | | |
| Contact#2 | 0.956 | 0.028 | | |
| Contact#3 | 0.508 | 0.012 | | |
| Contact#4 | 0.237 | 0.007 | | |
| Total Zn removed | 1.72 (88%) | | | |
| Total Fe removed | | 1.10 (99%) | | |
| Aqueous contents | Zn (g/L) | Fe (g/L) | S (g/L) | Removed S (g/L) |
| Fresh sulfate based solution | 0.000 | 0.003 | 2.84 | 0 |
| Contact#1 | 0.477 | 0.767 | 1.45 | 1.39 |
| Contact#2 | 0.522 | 0.395 | 1.90 | 0.94 |
| Contact#3 | 0.464 | 0.181 | 1.76 | 1.08 |
| Contact#4 | 0.349 | 0.079 | 1.81 | 1.03 |
| Total S removed | | | | 4.44 |

Based on aqueous assays, it is assumed that the organic loaded 4.44×80/100=3.55 g/L of S (as sulfate).

The Zn/Fe stripped organic was kept in the reactor where 80 L of 0.5 N HCl was added. A first contact between the organic and 0.5 N HCl aqueous phase was performed. After settling, both phases were sampled and aqueous phase was replaced by 80 L of fresh 0.5 N HCl for a second contact. Assay results follow:

| Organic contents | Zn (g/L) | Fe (g/L) | |
|---|---|---|---|
| Initial | 0.237 | 0.007 | |
| Contact#1 | 0.484 | 0.039 | |
| Contact#2 | 0.458 | 0.040 | |
| Aqueous contents | Zn (g/L) | Fe (g/L) | S (g/L) |
| HCl 0.5 N | na | na | na |
| Contact#1 | 0.001 | 0.010 | 1.50 |
| Contact#2 | 0.000 | 0.002 | 1.46 |
| Total S removed | | | 2.96 |

The S assays show that the S loaded in the organic was partially released in the HCl aqueous phase during two contacts. The pilot batch set-up could not prevent for aqueous phase cross-contamination because of left over heels in the bottom of the reactor after each step. This explains the increase of Zn and Fe contents after HCl contacts and the lower efficiency of S removal.

EXAMPLE 3

An organic solution initially made of 20 vol % Alamine 308, 75 vol % aromatic diluent (ShellSol A150 from Shell) and 5 vol % isodecanol (Exxal 10) was loaded during a pilot operation with 0.341 g/L Fe and 0.232 g/L Zn. The reactor vessel was a 2 L capacity beaker which was operated at ambient temperature. 600 mL of the Co stripped Zn/Fe loaded organic extractant solution and 600 mL of sulfate based solution (10.2 g/L S) were introduced in the reactor and kept in mixed contact for a few minutes, then agitation was stopped. Organic and aqueous phases were allowed to settle. Organic and aqueous samples were taken after phase separation. The assays showed that the Fe concentration dramatically went down while Zn concentration decreased marginally. The aqueous phase was discarded. The sulfate based solution contact was repeated three times replacing 600 mL of fresh sulfate based solution in the reactor each time and keeping the same organic for successive contacts.

| Organic contents | Zn (g/L) | Fe (g/L) | S (g/L) | Loaded S (g/L) |
|---|---|---|---|---|
| Initial | 0.232 | 0.341 | 0.004 | 0 |
| Contact#1 | 0.211 | 0.009 | 1.71 | 1.71 |
| Contact#2 | 0.148 | 0.000 | 3.01 | 1.30 |
| Contact#3 | 0.076 | 0.000 | 3.91 | 0.90 |
| Total Zn removed | 0.156 (67%) | | | |
| Total Fe removed | | 0.341 (100%) | | |
| Total S loaded | | | | 3.91 |

Zn and Fe are efficiently stripped out of the organic. One more aqueous contact will take the remaining Zn out.

| Aqueous contents | Zn (g/L) | Fe (g/L) | S (g/L) | Removed S (g/L) |
|---|---|---|---|---|
| Fresh sulfate based solution | 0.000 | 0.000 | 10.2 | 0 |
| Contact#1 | 0.022 | 0.362 | 8.42 | 1.78 |
| Contact#2 | 0.059 | 0.012 | 9.00 | 1.20 |
| Contact#3 | 0.075 | 0.000 | 9.32 | 0.88 |
| Total Zn recovered | 0.156 | | | |
| Total Fe recovered | | 0.374 | | |
| Total S removed from aqueous solution | | | | 3.86 |

The organic was kept in the reactor where 600 mL of 1 N HCl was added. A first contact between the organic and 1 N HCl aqueous phase was performed. After settling, both phases were sampled and aqueous phase was replaced by 600 mL of fresh 1 N HCl for a second contact. Eventually a third contact was made following the same procedure:

| Organic contents | Zn (g/L) | Fe (g/L) | S (g/L) | Removed S (g/L) |
|---|---|---|---|---|
| Initial | 0.076 | 0.000 | 3.91 | 0 |
| Contact#1 | 0.080 | 0.000 | 0.338 | 3.57 |
| Contact#2 | 0.080 | 0.001 | 0.051 | 0.287 |
| Contact#3 | 0.082 | 0.001 | 0.033 | 0.018 |
| Total S removed | | | | 3.87 |

| Aqueous contents | Zn (g/L) | Fe (g/L) | S (g/L) |
|---|---|---|---|
| HCl 1 N | 0.000 | 0.000 | 0.001 |
| Contact#1 | 0.000 | 0.000 | 3.79 |
| Contact#2 | 0.000 | 0.000 | 0.350 |
| Contact#3 | 0.000 | 0.000 | 0.030 |
| Total S removed from organic | | | 4.17 |

The S assays show that the S loaded on the amine dissolved in the aromatic based organic was well released in the HCl aqueous phase within three contacts.

EXAMPLE 4

An organic solution initially made of 20 vol % Alamine 308, 65 vol % aliphatic diluent (Isopar-M from Imperial Oil) and 15 vol % isodecanol (Exxal 10) was loaded during a pilot operation with 0.650 g/L Fe and 0.251 g/L Zn. The organic solution was fed into a continuous circuit which consists of 6 mixer-settlers. The three first receive some sulfate based solution, cross-current. The first three contacts enable Zn and Fe stripping from the organic into the aqueous solution. However, some sulfate is loading on the organic. The three other mixer-settlers are fed with HCl 1N solution, cross-current as well. In these stages, Chloride displaces sulfate in the organic, sulfate being released into the aqueous. The flow sheet is shown in FIG. 1

The profiles are as follows:

| Organic contents | Zn (g/L) | Fe (g/L) | S (g/L) | S difference (g/L) |
|---|---|---|---|---|
| Feed | 0.251 | 0.650 | 0.043 | 0 |
| Contact#1 (sulfates) | 0.164 | 0.181 | 2.34 | 2.30 |
| Contact#2 (sulfates) | 0.091 | 0.063 | 4.03 | 1.69 |
| Contact#3 (sulfates) | 0.045 | 0.019 | 4.19 | 0.160 |
| Contact#1 (HCl) | 0.164 | 0.020 | 2.05 | -2.21 |
| Contact#2 (HCl) | 0.091 | 0.025 | 0.784 | -1.27 |
| Contact#3 (HCl) | 0.045 | 0.025 | 0.195 | -0.589 |
| Total Zn removed | 82% | | | |
| Total Fe removed | | 96% | | |

Zn and Fe are efficiently stripped out of the organic. One more HCl stage will take the remaining sulfate out. Sulfates loaded in the first three stages and eventually get removed in the three following HCl stages.

| Aqueous contents | Zn (g/L) | Fe (g/L) | S (g/L) |
|---|---|---|---|
| Sulfate based feed | 0.000 | 0.000 | 10.9 |
| Contact#1 (sulfates) | 0.049 | 0.279 | 8.79 |
| Contact#2 (sulfates) | 0.060 | 0.108 | 9.48 |
| Contact#3 (sulfates) | 0.048 | 0.050 | 9.8 |
| HCl feed | 0.000 | 0.003 | 0.002 |
| Contact#1 (HCl) | 0.000 | 0.018 | 4.92 |
| Contact#2 (HCl) | 0.000 | 0.005 | 1.82 |
| Contact#3 (HCl) | 0.000 | 0.001 | 0.696 |

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

What is claimed is:

1. A process for regenerating metal loading capacity of an amine comprising:
   providing a liquid organic phase containing an amine complexed with a metal that loads on the amine as a chloride complex, wherein said metal is selected from the group consisting of Zn and Fe;
   contacting said liquid organic phase with an aqueous solution substantially free of chloride ions to strip said metal without formation of a metal precipitate; and
   contacting the stripped organic phase with a solution containing chloride ions to hydrochlorinate the amine.

2. A process for regenerating the metal loading capacity of an amine according to claim 1 wherein said amine has the formula $R^1 R^2 R^3 N$ wherein $R^1$, $R^2$ and $R^3$ may be the same or different and are selected from the group consisting of aliphatic, aryl, aromatic chain and hydrogen atom(s).

3. A process for regenerating the metal loading capacity of an amine according to claim 2 wherein said amine is a tertiary amine selected from the group consisting of triisobutylamine, trihexylamine, triisooctylamine, triisononylamine and triphenylamine.

4. A process for regenerating the metal loading capacity of an amine according to claim 1 wherein said liquid organic phase comprises an aliphatic diluent.

5. A process for regenerating the metal loading capacity of an amine according to claim 4 wherein said aliphatic diluent is a paraffin solvent.

6. A process for regenerating the metal loading capacity of an amine according to claim 5 wherein said paraffin solvent comprises isoparaffins.

7. A process for regenerating the metal loading capacity of an amine according to claim 1 wherein said liquid organic phase comprises an alcohol.

8. A process for regenerating the metal loading capacity of an amine according to claim 7 wherein the alcohol is an alkanol.

9. A process for regenerating the metal loading capacity of an amine according to claim 9 wherein the alkanol is isodecanol.

10. A process for regenerating the metal loading capacity of an amine according to claim 1 wherein said aqueous solution substantially free of chloride ions contains an ion selected from the group consisting of sulfate, nitrate and phosphate.

11. A process for regenerating the metal loading capacity of an amine according to claim 10 wherein the concentration of sulfate, nitrate or phosphate ranges from about 0.01 to about 300 grams per liter.

12. A process for regenerating the metal loading capacity of an amine according to claim 1 wherein said solution containing chloride ions is a hydrochloric acid solution.

13. A process for regenerating the metal loading capacity of an amine according to claim 12 wherein said hydrochloric acid solution ranges from about 0.5N to about 6N.

14. A process for regenerating the metal loading capacity of an amine according to claim 1 further comprising returning the hydrochlorinated amine to a solvent extraction circuit.

15. A process for regenerating the metal loading capacity of an amine according to claim 1 wherein the ratio of liquid organic phase to the aqueous solution (O/A ratio) is about 1.

16. A process for regenerating the metal loading capacity of an amine according to claim 1 wherein the temperature ranges from about 10° C. to about 80° C.

* * * * *

UNITED STATES PATENT AND TRADEMARK OFFICE
CERTIFICATE OF CORRECTION

PATENT NO. : 6,951,960 B2
DATED : October 4, 2005
INVENTOR(S) : J.J. Peraud

It is certified that error appears in the above-identified patent and that said Letters Patent is hereby corrected as shown below:

<u>Title page,</u>
Item [73], Assignee, should read -- Goro Nickel S.A., Noumea Cedex, New Caledonia 98845 --.

Signed and Sealed this

Twenty-third Day of May, 2006

JON W. DUDAS
*Director of the United States Patent and Trademark Office*